United States Patent
Tarnanen et al.

(10) Patent No.: US 6,904,026 B1
(45) Date of Patent: Jun. 7, 2005

(54) UPDATING OF INTERNET ACCESS POINT SETTINGS IN A MOBILE COMMUNICATION SYSTEM

(75) Inventors: Teemu Tarnanen, Espoo (FI); Abbas Moslemie, Helsinki (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/509,102

(22) PCT Filed: Sep. 15, 1998

(86) PCT No.: PCT/FI98/00724

§ 371 (c)(1),
(2), (4) Date: Mar. 21, 2000

(87) PCT Pub. No.: WO99/16263

PCT Pub. Date: Apr. 1, 1999

(30) Foreign Application Priority Data

Sep. 19, 1997 (FI) .................................................. 973737

(51) Int. Cl.[7] ................................................ H04Q 7/00
(52) U.S. Cl. ...................... 370/329; 370/338; 455/556
(58) Field of Search ............................ 370/310, 310.2, 370/328–9, 338, 351–4, 401–3, 329; 455/403, 422, 433–6, 461, 556, 466, 66, 67.1; 379/142.1, 265, 265.09; 709/203, 217, 218, 219

(56) References Cited

U.S. PATENT DOCUMENTS

| | | | |
|---|---|---|---|
| 5,095,480 A | | 3/1992 | Fenner |
| 5,490,139 A | * | 2/1996 | Baker et al. .................. 370/312 |
| 5,533,026 A | * | 7/1996 | Ahmadi et al. ............... 370/349 |
| 5,812,531 A | * | 9/1998 | Cheung et al. ............... 370/255 |
| 5,835,061 A | * | 11/1998 | Stewart ........................ 342/457 |
| 6,259,405 B1 | * | 7/2001 | Stewart et al. ............... 342/457 |

FOREIGN PATENT DOCUMENTS

| | | |
|---|---|---|
| EP | 695 058 | 1/1996 |
| EP | 696 117 | 2/1996 |

OTHER PUBLICATIONS

Stevens, TCP/IP Illustrated, vol. 1, 1994, Addison–Wesley, PP:10, 129–131.*

* cited by examiner

*Primary Examiner*—David Vincent
(74) *Attorney, Agent, or Firm*—Pillsbury Winthrop LLP

(57) ABSTRACT

A digital mobile communication system is provided with a facility by means of which it can establish a connection to the Internet network (12) via an Internet access point (14, 15). IAP settings needed for establishing a connection are stored in a mobile station (MS). When a mobile station (MS) roams, the closest point may, however, change, and IAP settings should be updated in the mobile station (MS). The invention comprises dividing the mobile communication system into IAP areas, which are given preferred IAPs. An IAP area may be e.g. a mobile communication network (11, 17). Mobile communication networks broadcast system information on the basis of which a mobile station may detect that the IAP area has changed and start a procedure for updating IAP settings. Updating may comprise retrieval of IAP settings from a special server (13) in the network maintained by an Internet service provider. Retrieval can be done e.g. via a short message service center (10). In one embodiment the mobile communication network broadcasts messages giving recommended IAP settings to mobile stations.

15 Claims, 3 Drawing Sheets

UPDATING OF INTERNET ACCESS POINT SETTINGS IN A MOBILE COMMUNICATION SYSTEM

This application is the national phase of international application PCT/FI98/00724 filed Sep. 15, 1998 which designated the U.S.

FIELD OF THE INVENTION

The invention relates generally to digital mobile communication systems and more particular to supporting roaming in connection with Internet services in a mobile communication system.

BACKGROUND OF THE INVENTION

Mobile communication systems refer, in general, to different telecommunication systems providing personal wireless data transmission while subscribers roam the system area. A typical mobile communication system is the public land mobile network PLMN.

Besides conventional speech transmission, digital mobile communication systems provide a plurality of services: short messages, facsimiles, data transmission, etc. Of these, the data transmission service, in particular, provides a mobile subscriber a chance of wireless access to nearly all data services of fixed networks.

The use of the TCP/IP (Transmission Control Protocol/Internet Protocol) data network, i.e. the Internet network, in fixed networks has increased very rapidly. As is well known, the Internet network actually comprises a large number of smaller interconnected TCP/IP networks. The Internet network has a number of TCP/IP application protocols available for users. From the end user's point of view the most important ones are the following:

TELNET. This protocol allows the user's terminal (or user application program) in one computer to communicate with an application process, e.g. a word processing program run in a remote computer, in another computer via the Internet network as if the user's terminal were directly connected to the other computer;

FTP (File Transfer Protocol). This protocol allows the user's terminal (or user application program) to access a remote file system and to interact with it;

SMTP. This protocol provides a network-wide mail transfer service between e-mail systems of different computers;

WWW (World Wide Web). The WWW system consists of servers in the Internet network and customer programs used by these servers, called WWW browsers. The information in the WWW servers is arranged into pages which are the basic units of the WWW techniques, as whole pages are always transferred between a server and a browser. In addition to text, the page may also contain graphics and various other file types, such as voice and video. The pages used by the WWW techniques are described with the HTML language (Hyper Text Mark-up Language). Information on text format, graphics, etc. is coded among the actual text contents by HTML tags. The browser program uses these tags to give a WWW page the desired format.

Internet applications are used for connecting to services in the Internet network. Before a user can connect to the Internet, he has to have a contract with an Internet service provider ISP, who provides access to the Internet via one or more Internet access points IAP. The ISP may be e.g. a commercial operator (as Eunet in Europe), university or private company. Usually, the IAP is a server to which the user has access from a telephone in the fixed network or from a mobile telephone by making a modem call (or a data call) to a certain IAP access number.

Through the data transmission services of mobile communication systems, the numerous information sources of the Internet network are, in principle, available to mobile subscribers, too. However, the user of data transmission services typically requires a mobile station provided with data transmission properties, and a computer connected thereto. At present, mobile stations including an integrated computer, such as the Nokia Communicator 9000, are available. This also has built-in facilities for connecting to the Internet network.

An ordinary subscriber of the fixed network usually need only one IAP, the one that is closest to him, and thus has the lowest call costs. A mobile subscriber may, however, roam within a large area in one country and even between different countries. If the mobile subscriber always uses the same IAP (home IAP) to connect to the Internet, call costs (data transmission costs) may increase considerably. For example, if the subscriber is roaming in Germany and his home IAP is in Finland, the use of Internet services via the home IAP entails an international call between Germany and Finland. To optimize data communication costs mobile subscribers would like to use the local IAP regardless of their location. The subscriber's Internet service provider ISP (as Eunet) may have numerous IAPs available all around the world. As regards a mobile subscriber, selecting the best possible IAP easily and, if possible, automatically may be problematic.

According to one method of the prior art, the subscriber manually reconfigures/changes/establishes a new IAP when he is in a new area. To carry out this subscriber needs a list of available IAPs telling how to set the correct IAP depending on the location of the subscriber. Manual configuration is, however, troublesome and error prone. Furthermore, the lists would not be up to date in the long run. For example, the Nokia Communicator 9000 is provided with a user interface supporting such as IAP list. The list may include e.g. the following information: 1) service provider's name; 2) telephone number of the IAP; 3) user's name (used in PPP authentication, if necessary); 4) password (used in PPP authentication, if necessary); 5) subscriber's own IP address; 6) IP addresses of the primary and secondary name servers.

In the case of the Nokia Communicator 9000 the service provider ISP is able to configure an IAP with a special short message, called SIAP SMS (Set Internet Access Point Short Message). This special short message carries out all necessary IAP settings in the mobile station and adds a new IAP to the list. The mobile station, however, asks the user to confirm the change before any action is taken. An advantage of this semi-automatic short message updating is that the user does not need to update information manually, which also eliminates errors. If this feature were used for supporting roaming, the user would need to call the service provider's customer service and to request information on the best IAP with respect to his location in a SIAP short message. From the user's point of view this is troublesome and may cause a considerable amount of extra work to the service provider, especially when the number of subscribers is large. Alternatively, the ISP could send a SIAP short message(s) to all subscribers when an IAP configuration has changed in some part of the world. This is, however, an inconvenient and expensive solution both for users and internet service providers.

DISCLOSURE OF THE INVENTION

The object of the present invention is to provide automatic selection of a local Internet access point for mobile subscribers as easily as possible during roaming.

This is achieved with a method of updating information on an Internet access point in the terminal equipment of a digital mobile communication system, which is capable of establishing a connection to the Internet via the mobile communication system and a group of Internet access points. The method is characterized in that it comprises the steps of storing settings of Internet access points that were used last time to access the Internet in the terminal equipment, storing system information on the mobile communication network or on part of the mobile communication network that was used last time to access the Internet;

receiving broadcast system information on the mobile communication network of the current location area of the terminal equipment or on part of the mobile communication network, comparing said received system information with said stored system information, starting a procedure for updating the stored Internet access point settings of the terminal equipment with Internet access point settings recommended for the currently used mobile communications network or for part of the mobile communication network, if it is noted on the basis of said stored and received system information that the mobile communication network or part of the mobile communication network has changed.

The invention also relates to a server as claimed in claim 8, a short message service centre as claimed in claim 9, terminal equipment as claimed in claim 13 and a mobile communication system as claimed in claim 14.

According to the invention, the mobile communication system is divided into areas which are given recommended or preferred Internet access points (IAP). In this application, these areas are referred to as IAP areas. Typically, the recommended or preferred IAP is the Internet service provider's (ISP) local IAP, to which data call costs from a mobile station are the lowest. In principle, the division of IAP areas may be a division of any kind. For example, each country or each mobile telephone operator's network may form an IAP area of its own. Alternatively, each mobile communication network can be divided into smaller IAP areas, e.g. according to the location area configuration of the network. When the division of IAP areas has been agreed on, the ISP only needs to name preferred IAPs for each IAP area. Naturally, different Internet service providers ISP have different IAPs in the same IAP area. According to the basic idea of the invention, a mobile station roaming within the system tries to select the preferred IAP of each IAP area to access the Internet. This can be called IAP roaming.

For IAP roaming, settings of the last used or updated IAP and system information identifying the IAP area (the mobile communication network or part of the mobile communication network) where the mobile station was located during the last Internet transaction or IAP updating are stored in the mobile station. The mobile station compares the system information broadcast by the serving cell with the above-mentioned stored system information. If it is possible to conclude on the basis of the comparison that the IAP area has changed, the mobile station updates the stored IAP settings with IAP settings which is receives from or retrieves via the mobile communication network and which are suitable for the IAP area in question. In a preferred embodiment of the invention, the mobile station retrieves IAP settings suitable for its location from a server, data base or the like maintained by the ISP. In an IAP request the mobile station indicates its location (IAP area) by means of certain system information, on the basis of which the ISP server selects IAP settings suitable for the location, and these settings are sent to the mobile station in response. In a second embodiment of the invention, preferred IAP settings are broadcast to mobile stations within an IAP area in broadcast messages, by means of which the mobile station can update IAP settings, if necessary. This allows to avoid a separate retrieval procedure, but on the other hand, messages additionally load both the network and mobile stations. Furthermore, message broadcast services are not available everywhere, which may limit the scope of the IAP roaming of the invention.

According to the preferred embodiment of the invention, the mobile station checks whether updating of IAP settings is necessary only when a new Internet transaction is initiated, i.e. the IAP is needed. This allows to avoid unnecessary updating when the mobile station roams in a network. This is advantageous especially in the preferred embodiment of the invention, in which IAP settings are retrieved from the ISP server. On the other hand, this may cause delay (even 10–15 s) when the first Internet data call is set up in a new area. In an embodiment in which new IAP settings are received in broadcast messages the delay is smaller. In one embodiment of the invention, the mobile station updates IAP settings each time it notes that an IAP area has changed. Thus IAP settings are always up to date, and there is no delay when the first Internet call is set up.

The preferred embodiment of the invention comprises a special message service centre, which either directly or via a data network is connected to equipment maintaining IAP settings of IAP areas or to an application referred to as an ISP server in this description. The mobile station requests IAP settings by sending a special "request Internet access point" message, i.e. a RIAP message. In the preferred embodiment of the invention, the RIAP message also includes system information, which identifies the current IAP area of the mobile station. It is also possible that the service centre has information on the IAP area or deduces the information itself. Then the service centre requests IAP settings from the ISP server according to the protocol required by the interface between them or by the data network. This request may include system information, which identifies the IAP area and by means of which the ISP server selects the IAP settings suitable for the location of the mobile station. These IAP settings are transmitted to the service centre, which forwards them to the mobile station in a special "set Internet access point" message, i.e. a SIAP message. The mobile station updates the stored IAP settings with the IAP settings it receives in a SIAP message.

In one embodiment of the invention, the message service centre retrieves unclassified IAP settings of IAP areas from an ISP server and selects the settings that are suitable for the location of the mobile station. For example, when the ISP server is in the Internet network, the service centre may retrieve an entire WWW page including IAP areas and their preferred IAP settings. From these service centre selects the IAP settings suitable for the mobile station and sends them to the mobile station in a SIAP message. In this embodiment the Internet service provider only needs to maintain a WWW page.

Compared with the prior art, the present invention has several advantages. As regards the user, the IAP roaming of the invention is a simple, automatic procedure, which guarantees up-to-date IAP settings and low call costs. As regards the Internet service provider ISP, the maintenance of necessary services at the server requires only a minimal amount of work and minimal costs.

BRIEF DESCRIPTION OF THE DRAWINGS

In the following, preferred embodiments of the invention will be described with reference to the accompanying drawings, in which.

PREFERRED EMBODIMENTS OF THE INVENTION

The present invention can be applied to all mobile communication systems which support circuit-switched speech and data services, and in which terminal equipment can establish a data connection to the Internet network via special Internet access points. The invention is particularly suitable for mobile communication systems having a short message service. In the present application, short message service generally refers to the transfer of a short text message of any kind between a mobile station and a special short message service unit without the need to set up a point-to-point connection. This is why the transfer of a short message may take place even when in the mobile station there is a speech or data call in progress on a circuit-switched point-to-point connection. Short message transfer is limited to one message, i.e. the transfer of one message constitutes the whole transaction. Thus, short message service is totally different from packet-switched data transmission. One example of short message service is short message service of the GSM system defined in recommendation ETSI GSM 03.40. Another example of message broadcast appropriate for the invention is the USSD (Unstructured Supplementary Service Data) defined in recommendation ETSI GSM 02.90, 03.90 and 04.90.

In the following the invention will be described in connection with the digital GSM (Global System for Mobile Communication). Regarding the invention, the operation and structure of the mobile communication system are not relevant, and hence they are described only to a degree that will assist in comprehending short message service. As to a more precise description of the GSM system, reference in made to the GSM recommendations and the publication "The GSM System for Mobile Communications", M. Mouly & M. Pautet, Palaiseau, France, 1992, ISBN:2-9507190-0-7.

Figure 1:
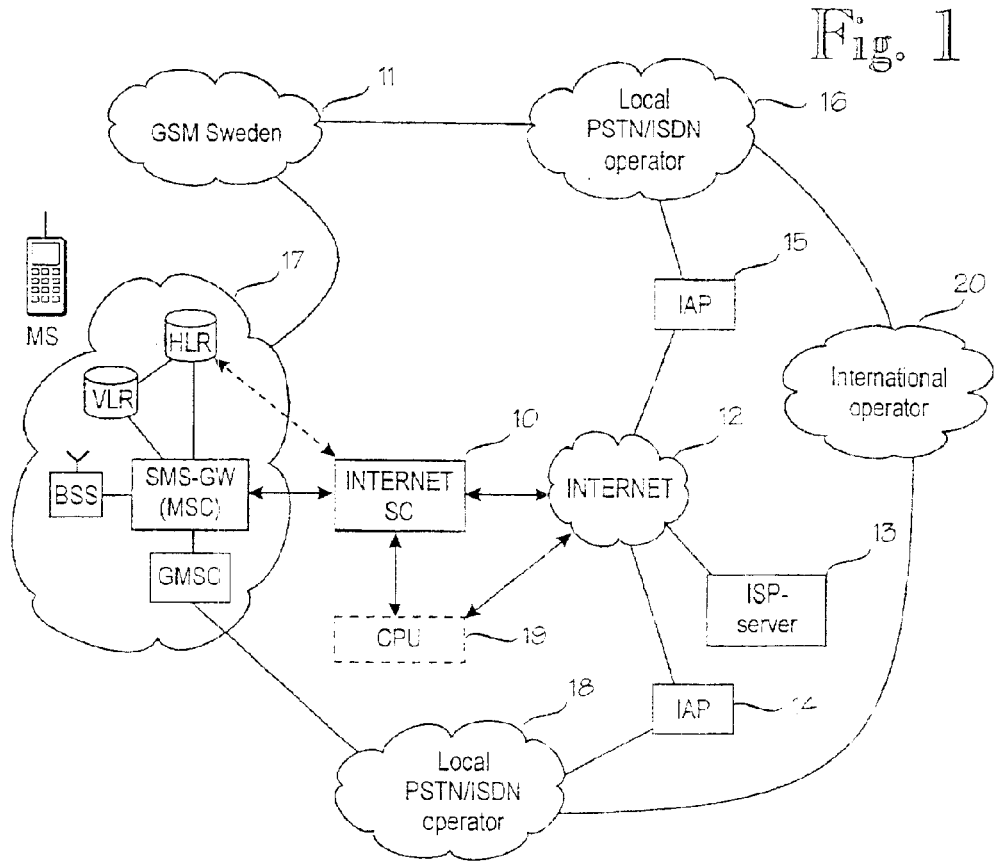
FIG. 1 is a system chart illustrating two mobile communication networks, local and international public switched telephone networks, the Internet network, Internet access points, an ISP server and Internet short message service centre.

FIG. 1 illustrates two GSM mobile communication networks 11 and 17. GSM network 17 is located in Finland, and GSM network 11 in Sweden. In the GSM network a mobile switching centre MSC switches incoming and outgoing calls. It also performs tasks typical of mobile telephone traffic, such as subscriber location management, in co-operation with the network subscriber registers VLR and HLR. The HLR is a subscriber's home register for permanent storage of subscriber data. This visitor location register VLR is a local register to which the subscriber data is copied from the HLR when a mobile subscriber visits the area of the VLR. Mobile stations MS communicate with the centre MSC via base station systems BSS. The BSS consists of a base station controller BSC and base stations BTS, i.e. fixed radio transceivers via which the mobile stations MS communicate with the mobile communication network over the radio path.

The MSC which functions as a gateway to another network (e.g. PSTN, ISDN, public data network PSDN) is called a gateway MSC, i.e. GMSC. In FIG. 1 GSM networks 11 and 17 are shown as connected to local PSTN/ISDN networks 16 and 18, respectively. PSTN/ISDN networks 16 and 18 are connected to each other and to PSTN/ISDN networks in other countries by means of an international transmission network 20.

The Internet network 12 is a world wide group of networks in accordance with the TCP/IP protocol. The Internet network is accessed from other telecommunication networks, e.g. PSTN/ISDN, via Internet access points. The Internet access service provider ISP may be e.g. a commercial operator, such as Eunet, university or private company. The ISP may have a separate IAP for each country, e.g. IAP 14 (Eunet Finland) and IAP 16 (Eunet Sweden) in FIG. 1. Typically, the IAP is a server which the user can access from an ordinary subscription in the fixed network or from a mobile station by making an ISDN/PSTN modem call (or a data call in the mobile communication network) to a certain number, called an IAP access number.

Through the data transmission services of mobile communication systems, the numerous information sources of the Internet network are, in principle, available to mobile subscribers, too. However, the use of data transmission services typically requires a mobile station provided with data transmission properties, and a computer connected thereto. At present, mobile stations including an integrated computer, such as the Nokia Communicator 9000, are available. This also has built-in facilities for connecting to the Internet network. In the following description it is assumed that the mobile station MS is, by way of example, an integrated terminal equipment similar to the Nokia Communicator.

As was stated above, settings of at least one IAP are stored in the MS, and the MS makes a data call to the IAP for Internet transaction on the basis of these settings. IAP settings may vary in different applications, but they typically include at least the IAP access number and the service provider's (ISP) name. It is assumed that the home network of the MS is GSM 17 (Finland) and its home IAP is IAP 14 in Finland. For example, when the MS is roaming in the GSM network 11 in Sweden, it would be most advantageous for the subscriber to use the local IAP 15 instead of the home IAP to avoid costs of an international call. As was described in greater detail in the introductory part of the application, a problem in this case is how the MS or the subscriber knows the most suitable IAP for each location.

According to the invention, the mobile communication system is divided into areas, which are given recommended or preferred Internet access points (IAP). In the present application, these areas are referred to as IAP areas. In FIG. 1 GSM network 17 forms one IAP area, and GSM network 11 another. The division of IAP areas may in principle be a division of any kind. Each Internet service provider ISP may name one or more preferred IAPs for an IAP area. In the example in FIG. 1 it is assumed that one ISP (e.g. Eunet) has as the preferred IAP of GSM network 17 IAP 14 (Eunet Finland), and as the preferred IAP of GSM network 11 IAP 15 (Eunet Sweden). According to the basic idea of the invention, a mobile station roaming in the system detects the change of the IAP area on the basis of system information broadcast by the serving base station and updates IAP settings so as to be able to establish an Internet call via the preferred IAP of the new IAP area. This procedure is described in greater detail with reference to flow charts shown in FIGS. 2 and 3, which illustrate operation of the MS in IAP roaming according to the invention. System information may be any information which is sent by the network and which can be used for identifying a network or part of it, e.g. country code, operator name, operator code, network name, network code and location area identifier.

Figure 2:
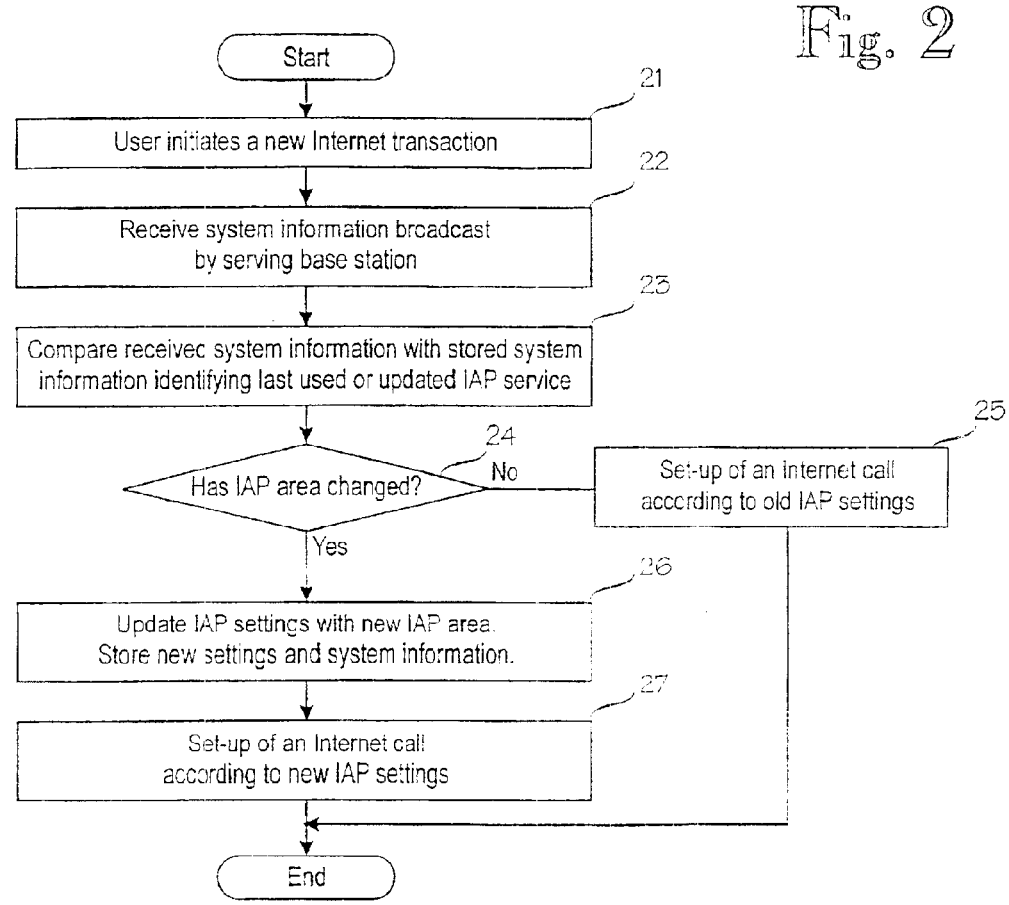

In the embodiment in FIG. 2, checking of the IAP area and a possible updating of IAP settings are carried out only when the user has initiated set-up of a new Internet call (Internet transaction) in the manner defined for the terminal equipment MS. Thus it is possible to avoid unnecessary updatings when the MS roams, but does not use an Internet service. On the other hand, when the first Internet call is set up in a new IAP area, delay may occur. At first, it is assumed that the settings of the IAP used in the previous Internet call as well as system information identifying the used IAP area (mobile communication network or part of the mobile communication network) are stored in the memory of the MS. When the user initiates a new Internet transaction (step 21), the MS receives system information broadcast by the serving base station on the control channel (step 22). The MS compares the received system information with the stored system information of the IAP area used in the previous call to check whether the IAP area has changed (steps 23 and 24). If the IAP area has not changed, the MS does not need to change IAP settings, but it sets up an Internet call on the basis of old IAP settings via the old IAP (step 25). If the change of the IAP area is noted in step 24, the MS updates its IAP settings according to the new IAP area (step 26), as will be explained in greater detail below. New IAP settings and system information on the new IAP area are stored in the MS (step 26). After this the MS sets up an Internet call according to new IAP settings via the new IAP (step 27).

Figure 3:
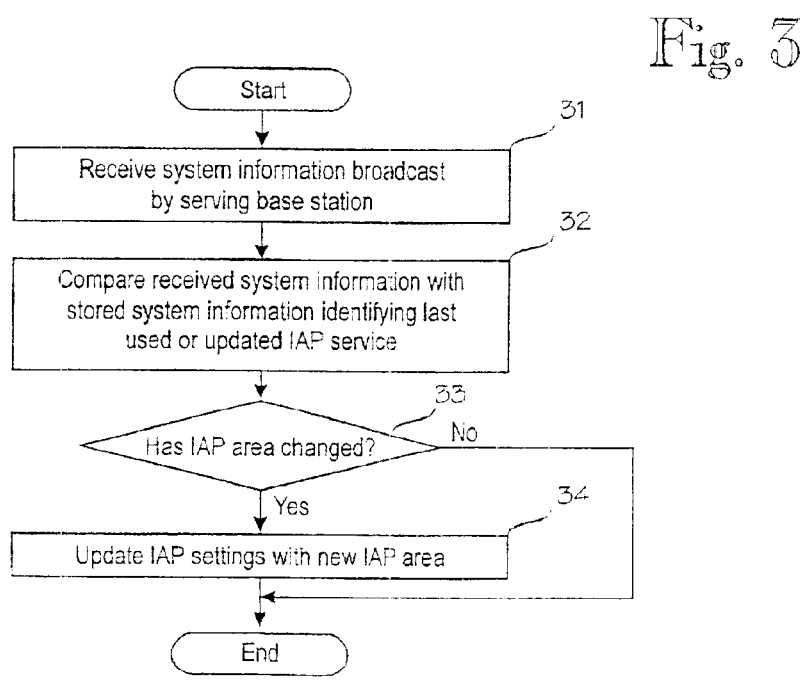
FIGS. 2 and 3 are flow charts illustrating IAP roaming and updating of IAP settings carried out by a mobile station.

In the embodiment in FIG. 3, the MS updates IAP settings each time it notes that the IAP area changes. This embodiment guarantees up-to-date IAP settings and fast set-up of an Internet call. On the other hand, frequent updatings may load both the MS and the network. At first, it is assumed that settings of the IAP used in the previous Internet call or updated last as well as system information identifying the used IAP area (mobile communication network or part of it) are stored in the memory of the MS. The MS continuously receives system information broadcast by the serving base station (step 31). At appropriate points, e.g. when changing the call, location area or network, the MS compares the received system information with the stored information to check whether the IAP area has changed (steps 32 and 33). If the IAP area has not changed, the MS does not need to alter IAP settings. If the change of the IAP area is noted in step 33, the MS updates its IAP settings according to the new IAP area (step 34), as will be explained in greater detail below. New IAP settings and system information on the new IAP area are stored in the MS (step 34).

Figure 5:
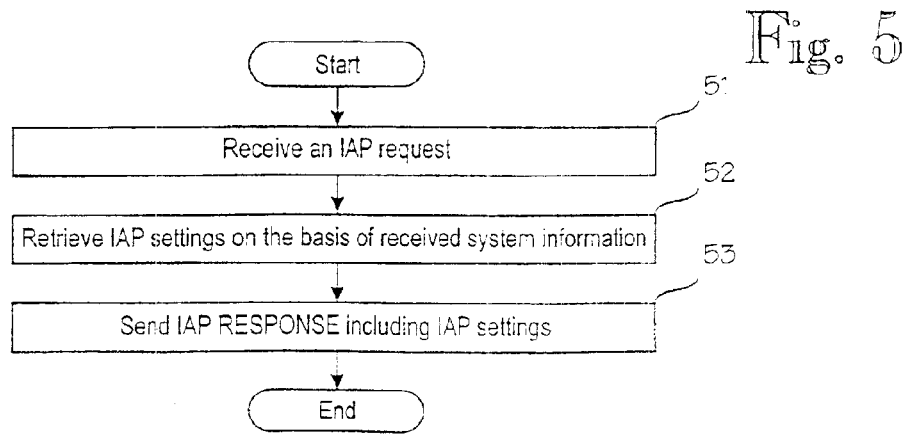
FIG. 5 is a flow chart illustrating operation of the ISP server.
Figure 6:
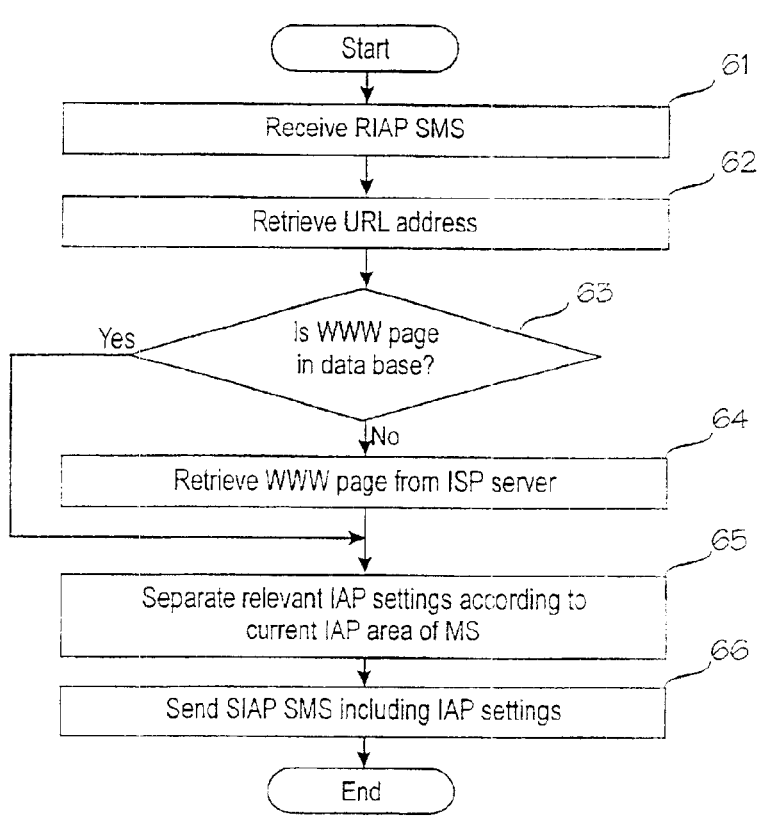
FIG. 6 is a flow chart illustrating operation of a service centre SC.

The actual updating stages (26 and 34 in FIGS. 2 and 3) of IAP settings can be realised in several alternative ways. In the preferred embodiment of the invention, which will in the following be described with reference to FIGS. 4–6, the MS retrieves new IAP settings from an equipment, application, data base, server or the like on the network side, generally referred to as a server herein. A server is advantageously maintained by the ISP and located outside the mobile communication network. In principle, retrieval of IAP settings can be carried out by setting up a data call directly to the server. In the preferred embodiment of the invention the retrieval is, however, carried out by utilizing short message service, such as the SMS or USSD of the GSM.

The European Telecommunications Standards Institute (ETSI) standard GSM 03.40 describes the point-to-point (PP) short message service (SMS) of the GSM system. The SMS of the GSM network offers means for transferring short messages with limited length (160 ASCII characters) between mobile stations MS and a short message service centre SC 10 which is outside the GSM network 11. Mobile originated (MO) and mobile terminated (MT) short message transmissions are defined as separate services. MO short messages are transferred from the MS to the service centre SC. These short messages may be destined for other mobile station users or for subscribers on a fixed network. MT short messages are transferred from the service centre SC to the MS. These short messages may have arrived at the service centre SC from other mobile station users or from other sources. The protocol employed between the SC and the MS is called SM-TP (Short Message Transport Protocol).

The service centre SC is connected to the mobile communication network via a certain MSC, called the SMS-GatewayMSC when MT short messages are involved, and SMS-InterworkingMSC when MO short messages are involved. The present application uses a common name SMS-Gateway (SMS-GW). The SMS-GW relays short messages between a MS and the SC and performs the HLR (and VLR) inquiries needed for an MT message in a call. The service centre SC is given a dedicated ISDN number in the number space of the GSM network, and the MS uses the ISDN number for addressing a short message to the SC.

It should be noted that, as regards the invention, it is insignificant how the short message service support has been implemented in the middle communication system. In the GSM system, for example, the invention is applicable to existing networks supporting short message service. An example of such a network is the GSM network of Radiolinja Oy in Finland. The mobile station may also be any kind of mobile station supporting short message service. An example is the Nokia 2110 GSM and Communicator 9000.

Regarding the invention, it is not essential how the SC is connected to the ISP server, via the Internet network or another data network or with a direct link. In all cases the procedure can be in accordance with that illustrated e.g. in FIG. 4.

When using the USSD service, the service centre 10 can be implemented in a substantially similar way. In the case of the USSD the SC, however, typically connects to the GSM network via the HLR, as is illustrated by a broken line in FIG. 1. Furthermore, message exchange between the HS and the SC is naturally carried out in the manner defined for the USSD.

Figure 4:
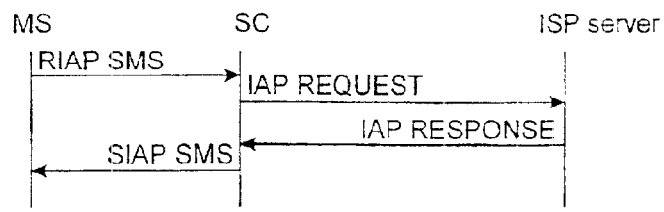
FIG. 4 is a signalling chart illustrating retrieval of IAP settings from an ISP server.

Referring to FIG. 4, the MS requests IAP settings by sending a special "request Internet access point" message, RIAP or SMS (or RIAP USSD) to the short message centre SC. In the preferred embodiment of the invention the RIAP also contains system information identifying the current IAP area of the MS. It is also possible that the SC has information on the IAP area or deduces the information itself. Then the SC requests IAP settings from the ISP server according to the protocol required by the interface between them or by the data network (IAP Request). This request may contain system information which identifies the IAP area and by means of which the ISP server selects the IAP settings suitable for the location of the mobile station. These IAP settings are transmitted to the SC in an IAP response. The SC forwards them to the MS in a special "set Internet access point" message, SIAP SMS (or SIAP USSD) to the mobile station. The MS updates the stored IAP settings with the IAP settings it receives in the SIAP SMS. The format of the SIAP SMS may be similar to the one supported by the Nokia Communicator 9000.

Referring to FIG. 1, in the preferred embodiment of the invention the service centre SC is connected to the Internet network 12 so that it can be used as a gateway between the GSM network and the Internet network. The interface between the short message service centre SC and the Internet network may be a direct interface, or the SC may be in connection with a separate computer equipment having access to the Internet network 12. Such a separate equipment is illustrated by a CPU 19 in FIG. 1.

In this way the SC brings the information sources of the Internet network 12 to the use of mobile subscribers via short message service. Implementation of the SC and information retrieval by means of short messages is described in greater detail in the applicant's co-pending application FI963659, which is incorporated herein by reference. In general, the SC uses HTTP and HTML protocols towards the Internet network 12. The HTTP protocol again uses TCP/IP interfaces. WWW server and customer programs usable in a service centre computer (computers) SC in retrieving WWW pages according to the HTP and HTML protocols from the Internet network are commercially available for different operating systems (such as Unix). The interface 41 between the GSM network and the service centre SC may be similar to that in present short message service centres.

In the preferred embodiment of the invention such an Internet SC is utilized for retrieving IAP settings from the Internet service provider's (ISP) server in the Internet network, e.g. ISP server 13 in FIG. 1.

Figure 7:
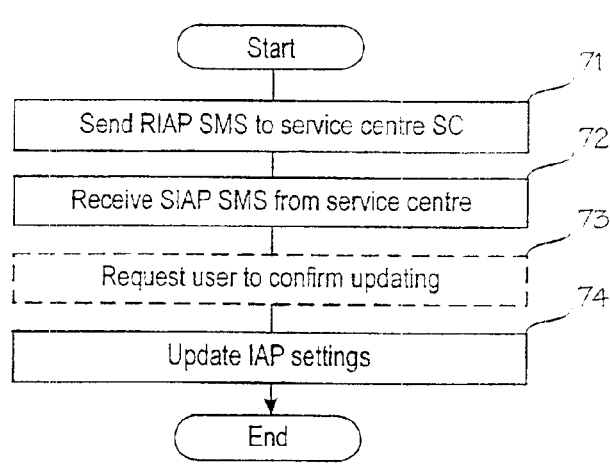
FIG. 7 is a flow chart illustrating operation of the MS when IAP settings are retrieved from the network.

When requiring IAP settings from an Internet WWW page, the MS sends a RIAP short message addressed (ISDN number) to the service centre SC of the home network 17 (step 71, FIG. 7), the message contains an identifier for directly or indirectly indicating said WWW page. Direct indication contains e.g. the WWW page address, URL. Examples of URL addresses are http://www.nokia.com and http://www.uspto.gov/. In an embodiment of the invention, instead of an URL address, the user keys in a short keyword in the short message indirectly indicating the desired WWW page. This may be e.g. the name of the ISP, such as Euent Finland. The data base of the service centre SC comprises a table for linking keywords and WWW page addresses. The RIAP SMS also includes a system identifier identifying the current IAP area of the MS.

A RIAP short message is transferred to the service centre SC as a normal MO short message, when the MS roams in another GSM network, e.g. in the network 11 in Sweden, the RIAP SMS is transferred to the home network 17, and via the SMS-GW to the service centre SC. Having received the short message, the SC retrieves on the basis of the keyword the URL address from the table. Then the SC sends an IAP request corresponding to the URL address to the ISP server, and the request contains a system identifier identifying the current IAP area of the MS. The ISP server 13 contains a list, which links IAP areas with preferred IAP settings. When the ISP server 13 receives an IAP request (step 51, FIG. 5), it searches for IAP settings corresponding best to the location (IAP area) of the MS on the basis of the received system information (step 52). Then the ISP server 13 sends the selected IAP settings to the SC in an IAP response (step 53). The SC forwards the IAP settings to the MS in a SIAP short message. The MS receives the SIAP short message (step 72, FIG. 7) and possibly shows the new IAP settings to the user to obtain a confirmation and/or to carrying out possible user-specific additions or changes (step 73). Then the MS updates the IAP settings (step 74).

In the above embodiment IAP settings were selected by an ISP server. One way of implementing said list and selection is to use WWW pages having interrogation scripts, i.e. interrogation expressions produced by means of a command language. In other words, already the WWW server maintaining WWW pages filters relevant IAP settings according to the received system information (IAP area) from the list on a WWW page and sends them to the service centre SC as a WWW page. The service centre has to know the interrogation format of each WWW page (service).

In the second embodiment of the invention, IAP lists are realised as WWW pages of the ISP server, but IAP settings are selected by the SC. Having received the short message, the SC retrieves the URL address from the table on the basis of the keyword (steps 61–62, FIG. 6). Then the SC preferably checks if said WWW page has been retrieved previously and stored in the data base of the SC (step 63). If the data base does not include the page, the SC retrieves the WWW page corresponding to the URL address from the Internet network and stores it (step 64). The SC separates or "filters" only IAP settings relevant with respect to the current IAP area of the MS from the WWW page (step 65) and sends them to the MS in a SIAP short message (step 66).

Principles disclosed in the application F1963659 can be directly applied to both the embodiments described above.

One optional feature of the GSM system is short message service cell broadcast, SMS-CB. It comprises broadcasting digital information messages ("short messages") cyclically towards the MS in a certain geographic area. Accordingly to the present GSM recommendations, short message service cell broadcasts are not encrypted or provided with an address, and hence any MS designed for this service can receive and decode them. The recommendations do not, however, define who produces these messages for the network and how they are produced. A classical example of the use of cell broadcast is road traffic information.

Figure 8:
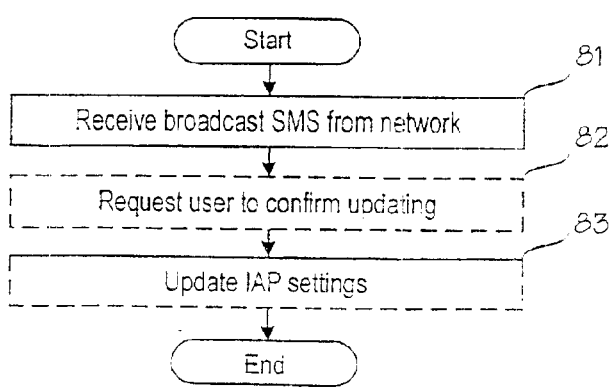
FIG. 8 is a flow chart illustrating operation of the MS when IAP settings are received in broadcast short messages.

In the second embodiment of the invention, preferred cell broadcast is used for updating IAP settings in steps 26 and 34 (FIGS. 2 and 3). The short message service centre or another application is reserved for this purpose, e.g. in FIG. 1 the service centre SC provides cell broadcast messages containing preferred IAP settings of a certain IAP area. The format of short message contents may be similar to that of the above-mentioned SIAP message. Short messages are broadcast in every cell within said IAP area. In other IAP areas different IAP settings are broadcast. All mobile stations, which are within the IAP area and support the SMS-CB, receive the short message (step 81, FIG. 8) and may update IAP settings, if necessary (step 83). The MS may also show new IAP settings to the user and ask for confirmation (step 82). In the preferred embodiment of the invention the MS allows updating of IAP settings only when the IAP area changes. The mobile station could update IAP settings each time it receives a short message service cell broadcast, but this is not a very practical alternative. In updating based on the SMS-CB a separate retrieval procedure of IAP settings is avoided. On the other hand, the number of messages sent is considerable, which loads both the network and mobile stations. However, all networks and mobile station probably do not support the SMS-CB, which may limit the scope of IAP roaming according to the invention.

In one embodiment of the invention, the subscriber may have subscriber-specific additional settings defined in server 13. In that case, the subscriber's MSISDN, on the basis of which the ISP server can send back the IAP settings tailored for the subscriber, can also be transferred to the server in a RIAP request.

The invention has been described above by means of preferred embodiments. The invention is, however, not limited to the solutions disclosed, but may be modified within the scope and spirit of the appended claims.

What is claimed is:

1. A method of updating Internet access point information in the mobile station of a digital mobile communication system, comprising:
   the mobile station establishing a connection via the mobile communication system to one of a number of Internet access points providing access to the Internet,
   the mobile station storing settings of Internet access points that were used last time to access the Internet,
   the mobile station storing system information on the mobile communication network or on part of the mobile communication network used to access the Internet last time,
   the mobile station receiving broadcast system information on the mobile communication network or on part of the mobile communication network in the current location of the mobile station,
   the mobile station comparing said received system information with said stored system information,
   the mobile station starting a procedure for updating the stored Internet access point settings of the mobile station with Internet access point settings recommended for the currently used mobile communication network or for part of the mobile communication network, if the mobile station notes, on the basis of said stored and received system information, that the mobile communication network or part of the mobile communication network has changed.

2. A method as claimed in claim 1, further comprising
   the mobile station carrying out said comparison only when a new Internet transaction is started, and
   the mobile station carrying out said updating procedure before setting up a call to the Internet access point via the mobile communication system, if the mobile station notes, on the basis of said stored and received system information, that the mobile communication network or part of the mobile communication network has changed.

3. A method as claimed in claim 1, wherein said updating procedure comprises
   the mobile station requesting Internet access point settings from the Internet service provider's server via the mobile communication system, said request comprising system information identifying the current mobile communication system of the mobile station or part of the mobile communication system,
   receiving said request at said server
   selecting in said server on the basis of system information included in said request Internet access point settings suitable for the current location of the mobile station,
   sending selected settings from said server via the mobile communication network to the mobile station,
   receiving selected settings in the mobile station, and
   updating Internet access point settings of the mobile station with said selected settings.

4. A method as claimed in claim 1, wherein said updating procedure comprises
   the mobile station sending a message requesting Internet access point settings to a message service centre, which has an access to the Internet network, said message comprising system information identifying the current mobile communication network of the mobile station or part of the mobile communication network,
   receiving said message in said message centre,
   sending a request for Internet access point settings from the message centre to the Internet service provider's server by using protocols of the Internet network, said request comprising system information identifying the current mobile communication network of the mobile station or part of the mobile communication network,
   receiving said request in said server,
   selecting in said server on the basis of system information included in said request Internet access point settings suitable for the current location of the mobile station,
   sending a response including the selected settings from said server to the message service centre by using protocols of the Internet network,
   receiving said message in the mobile station, and
   updating Internet access point settings of the mobile station with said selected settings.

5. A method as claimed in claim 1, wherein said updating procedure comprises
   the mobile station sending a message requesting Internet access point settings to a message service centre, which has an access to the Internet network, said message comprising system information identifying the current mobile communication network of the mobile station or part of the mobile communication network,
   receiving said message in said short message service centre,
   retrieving the World Wide Web (WWW) page including Internet access point settings from the Internet network by using protocols of the Internet network as a response to said message sent by mobile station,
   selecting Internet access point settings suitable for the location of the mobile station from the received WWW page on the basis of said system information,
   sending a message including said selected settings from the message service centre to the mobile station,
   receiving said message in the mobile station, and
   updating Internet access point settings of the mobile station with said selected settings.

6. A method as claimed in claim 1, further comprising the mobile communication network or part of the network broadcasting messages including information on settings of the recommended Internet access point to the mobile station,
   the mobile station updating stored Internet access point settings of the mobile station with Internet access point settings included in said broadcast message, if the mobile station notes, on the basis of stored and received system information, that the mobile communication network or part of the mobile communication network has changed.

7. A method as claimed in claim 1, wherein said system information is one of the following: country code, operator name, operator code, network name, network code, location area identifier.

8. A mobile station of a digital mobile communication system, said mobile station comprising
- means for establishing a connection via a mobile communication system to one of a number of Internet access points providing access to the Internet,
- a memory in which Internet access point settings used last time to access the Internet are stored,
- a memory in which system information identifying the mobile communication network or part of the mobile communication network used last time to access the Internet is stored,
- means for receiving broadcast system information on the mobile communication network or part of the mobile communication network of the current location of the mobile station,
- means for comparing said received system information with said stored system information, and
- updating means for starting the procedure for updating stored Internet access point settings of the mobile station with settings of the Internet access point recommended for the currently used mobile communication network or for part of the mobile communication network, if it is noted on the basis of the stored and received system information that the mobile communication network or part of the mobile communication network has changed.

9. A mobile station of a digital mobile communication system, said mobile station comprising:
- means for establishing a connection via a mobile communication system to one of a number of Internet access points providing access to the Internet,
- a memory in which Internet access point settings used last time to access the Internet are stored,
- a memory in which system information identifying the mobile communication network or part of the mobile communication network used last time to access the Internet is stored,
- means for receiving broadcast system information on the mobile communication network or part of the mobile communication network of the current location of the mobile station,
- means for comparing said received system information with said stored system information in response to initiation of a new Internet transaction, and
- updating means responsive to said means of comparison to carry out said updating procedure before setting up a call via the mobile communication system to an Internet access point, if the mobile station notes on the basis of said stored and received information that the mobile communication network or part of the mobile communication network has changed.

10. A mobile state of a digital mobile communication system, said mobile station comprising:
- means for establishing a connection via a mobile communication system to one of a number of Internet access points providing access to the Internet,
- a memory in which Internet access point settings used last time to access the Internet are stored,
- a memory in which system information identifying the mobile communication network or part of the mobile communication network used last time to access the Internet is stored,
- means for receiving broadcast system information on the mobile communication network or part of the mobile communication network of the current location of the mobile station,
- means for comparing said received system information with said stored system information, and
- updating means for starting the procedure for updating stored Internet access point settings of the mobile station with settings of the Internet access point recommended for the currently used mobile communication network, if it is noted, on the basis of the stored and received system information, that the mobile communication network or part of the mobile communication network has changed, said updating means in the mobile state further including
  i) means for requesting Internet access point settings from the Internet service provider's server via the Internet, said request comprising system information identifying the current mobile communication network or part of the mobile communication network of the mobile station, and
  ii) means for receiving a response including requested settings from the server via the mobile communication system, and for updating Internet access point settings of the mobile station with the received settings.

11. A mobile station of a digital mobile communication system, said mobile station comprising:
- means for establishing a connection via a mobile communication system to one of a number of Internet access points providing access to the Internet,
- a memory in which Internet access point settings used last time to access the Internet are stored,
- a memory in which system information identifying the mobile communication network or part of the mobile communication network used last time to access the Internet is stored,
- means for receiving broadcast system information on the mobile communication network or part of the mobile communication network of the current location of the mobile station,
- means for comparing said received system information with said stored system information, and
- updating means for starting the procedure for updating stored Internet access point settings of the mobile station with setting of the Internet access point recommended for the currently used mobile communication network or for part of the mobile communication network, if it is noted, on the basis of the stored and received system information, that the mobile communication network or part of the mobile communication network has changed, said updating means in the mobile station further including
  i) means for sending a short message requesting Internet access point settings to the message service centre, which has an access to the Internet network, said message containing system information identifying the current mobile communication network or part of the mobile communication network of the mobile station, and
  ii) means for receiving a message containing the requested settings from the message centre, and for updating Internet access point settings of the mobile station with the received settings.

12. A mobile station as claimed in claim 8, wherein the mobile station comprises means for receiving broadcast messages containing information on the settings of the recommended Internet access point, and wherein said updating means are responsive to means of comparison for updating stored Internet access point settings of the mobile station with Internet access point settings included in said broadcast message, if it is noted, on the basis of the stored and received system information, that the mobile communication network or part of it has changed.

13. A mobile station as claimed in claim 8, wherein said system information is one of the following: country code, operator's name, operator code, name of the network, network code, location area identifier.

14. A digital mobile communication system, comprising a message service and a mobile station capable of establishing a connection via a mobile communication system to a number of Internet access points providing access to the Internet, wherein the mobile communication system is configured to broadcast to the mobile station messages including settings of at least one local Internet access point, which is recommended to be used in part of the mobile communication system in question.

15. A mobile station of a digital mobile communication system, comprising:

a connectivity via a mobile communication system to a number of Internet access points providing access to the Internet, a memory in which Internet access point settings used last time to access the Internet are stored, a memory in which system information identifying the mobile communication network or part of the mobile communication network used last time to access the Internet is stored, a receiver receiving broadcast system information on the mobile communication network or part of the mobile communication network of the current location of the mobile station, a comparator comparing said received system information with said stored system information, and a controller starting a procedure for updating stored Internet access point settings of the mobile station with settings of the Internet access point recommended for the currently used mobile communication network or for part of the mobile communication network, if it is noted, on the basis of the stored and received system information, that the mobile communication network or part of the mobile communication network has changed.

* * * * *

UNITED STATES PATENT AND TRADEMARK OFFICE
CERTIFICATE OF CORRECTION

PATENT NO. : 6,904,026 B1 Page 1 of 1
DATED : June 7, 2005
INVENTOR(S) : Teemu Tarnanen et al.

It is certified that error appears in the above-identified patent and that said Letters Patent is hereby corrected as shown below:

Title page,
Item [86], Filing Date, replace "March 21, 2000" with -- March 16, 2000 --.

Signed and Sealed this

Sixteenth Day of August, 2005

JON W. DUDAS
*Director of the United States Patent and Trademark Office*